(12) United States Patent
Grönvall

(10) Patent No.: US 10,751,735 B2
(45) Date of Patent: Aug. 25, 2020

(54) HYDROCYCLONE SEPARATOR

(71) Applicant: Metso Sweden AB, Trelleborg (SE)

(72) Inventor: Lars Grönvall, Trelleborg (SE)

(73) Assignee: Metso Sweden AB, Trelleborg (SE)

( * ) Notice: Subject to any disclaimer, the term of this patent is extended or adjusted under 35 U.S.C. 154(b) by 0 days.

(21) Appl. No.: 16/062,325

(22) PCT Filed: Dec. 15, 2016

(86) PCT No.: PCT/EP2016/081257
§ 371 (c)(1),
(2) Date: Jun. 14, 2018

(87) PCT Pub. No.: WO2017/102985
PCT Pub. Date: Jun. 22, 2017

(65) Prior Publication Data
US 2018/0369835 A1    Dec. 27, 2018

(30) Foreign Application Priority Data

Dec. 18, 2015    (EP) .................................... 15201333

(51) Int. Cl.
*B04C 5/16*    (2006.01)
*B04C 5/103*    (2006.01)
*B01D 21/26*    (2006.01)

(52) U.S. Cl.
CPC ................ *B04C 5/16* (2013.01); *B04C 5/103* (2013.01); *B01D 21/267* (2013.01)

(58) Field of Classification Search
CPC .. B04C 5/14; B04C 5/16; B04C 5/103; B01D 21/267

(Continued)

(56) References Cited

U.S. PATENT DOCUMENTS 2,622,735 A    9/1949    Criner
2,995,255 A    8/1961    Demeter
(Continued)

FOREIGN PATENT DOCUMENTS

CN    101985115    3/2011
CN    201815392    5/2011
(Continued)

OTHER PUBLICATIONS

"Warman Hydrocyles". Warman International Ltd. JRA 5019 5M 1988/11. 1988.

(Continued)

*Primary Examiner* — Joseph C Rodriguez
(74) *Attorney, Agent, or Firm* — Andrus Intellectual Property Law, LLP

(57) ABSTRACT

A hydrocyclone separator for classifying solid material in liquid suspension is disclosed. The hydrocyclone separator comprises a head part having an inlet conduit, a conically tapered separation part, an adjustable apex discharge port, and a tail pipe. According to the invention the adjustable apex discharge port comprises an abrasive-resistant resilient body in which an apex orifice port is arranged, and an adjustment sleeve configured to circumferentially enclose the resilient body, which sleeve has a tapered conical surface configured to abut an outer surface of the resilient body, and which sleeve is arranged for axial displacement to thereby vary the size of the apex orifice port.

10 Claims, 5 Drawing Sheets

(58) Field of Classification Search
USPC ........................................................ 209/733
See application file for complete search history.

(56) References Cited

U.S. PATENT DOCUMENTS

| | | | |
|---|---|---|---|
| 3,025,965 A | | 3/1962 | Bergman et al. |
| 3,034,647 A | | 5/1962 | Giesse |
| 3,988,239 A | | 10/1976 | Malina |
| 4,564,443 A | * | 1/1986 | Bliss .................... B04C 3/06 |
| | | | 209/725 |
| 4,623,458 A | | 11/1986 | Hakola |
| 4,793,925 A | * | 12/1988 | Duvall ................. B04C 5/08 |
| | | | 209/727 |

FOREIGN PATENT DOCUMENTS

| | | |
|---|---|---|
| CN | 102389864 A | 3/2012 |
| CN | 202224254 U | 5/2012 |
| GB | 889253 | 2/1962 |
| GB | 889523 A | 2/1962 |
| RU | 2047394 C1 | 1/1992 |
| SU | 535968 A1 | 5/1973 |
| SU | 1057121 A1 | 5/1982 |
| WO | WO-0027539 A1 * | 5/2000 ............... B04C 5/16 |

OTHER PUBLICATIONS

"Linatex Fluid Adjustable Spigot". Document reproduced Apr. 24, 2019.
International Search Report and Written Opinion for International Patent Application No. PCT/EP2016/081257 dated Mar. 10, 2017.
International Preliminary Report on Patentability for International Patent Application No. PCT/EP2016/081257 dated Dec. 13, 2017.
Extended European Search Report for European Application No. 15201333.0 dated May 30, 2016.
Chinese Search Report for China Application No. 201680074470X dated Oct. 23, 2019.
Acceptance Decision for corresponding Russian Patent Application No. 2018123790 dated Jan. 23, 2020.
Office Action for corresponding Chilean Patent Application No. 1636-2018 dated Feb. 12, 2020.

* cited by examiner

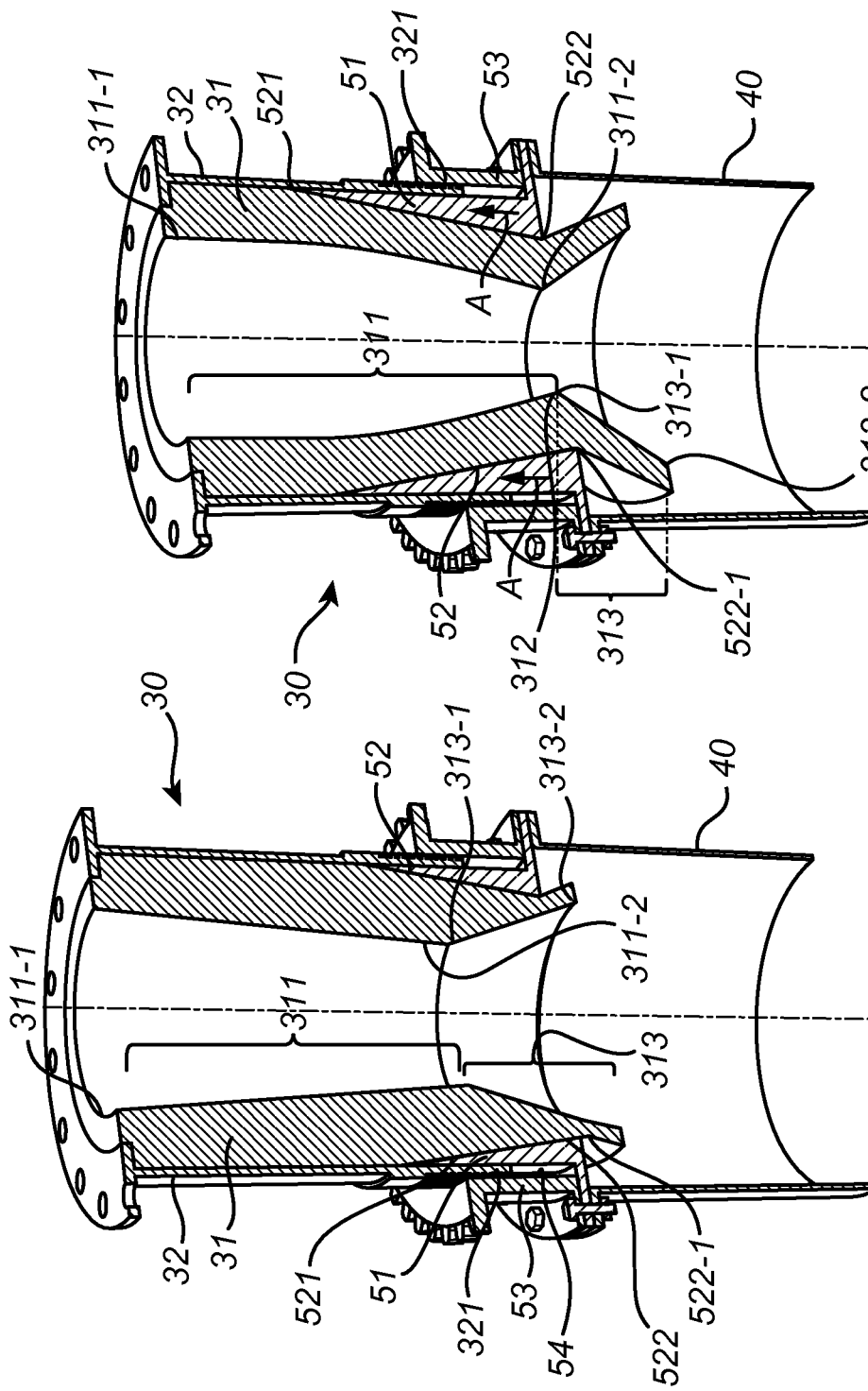

HYDROCYCLONE SEPARATOR

CROSS-REFERENCE TO RELATED APPLICATIONS

This application claims priority to PCT/EP2016/081257, filed Dec. 15, 2016, and published in English on Jun. 22, 2017 as publication number WO 2017/102985A1, which claims priority to EP Application No. 15201333.0, filed Dec. 18, 2015, the disclosures of which are incorporated herein by reference.

FIELD OF THE INVENTION

The present invention relates to a hydrocyclone separator for classifying solid material in liquid suspension. More closely it relates to a hydrocyclone separator comprising a head part having an inlet conduit adapted to feed a suspension into the head part, and having an overflow discharge tube arranged axially into the head part, a conically tapered separation part, an adjustable apex discharge port, and a tail pipe.

BACKGROUND

Hydrocyclone separators are known to be useful for the classification or fractionation of coarse from fine solids suspended in a liquid. In general, a hydrocyclone is an enclosed vortical machine usually comprising a short cylindrical section followed by a conical section. Feed of a suspension of solids is supplied under predetermined pressure tangentially or in a volute path into the head part so as to create therein a swirling stream of fluid, which stream follows a path of gradually decreasing radius toward the point of the narrowest radius of the cone, commonly known as the apex.

As the spiral path approaches the apex of the hydrocyclone, a portion of it turns and begins to flow towards the opposite end, i.e. towards the cylindrical section. Also this flow is in a spiral path of radius smaller than the radius of the first spiral while rotating in the same direction. Thus a vortex is generated within the hydrocyclone. The pressure will be lower along the central axis of the vortex and increase radially outwardly. The idea is that the hydrocyclone will separate the particles of the slurry according to shape, size and specific gravity with faster settling particles moving towards the outer wall of the hydrocyclone eventually leaving the hydrocyclone through the apex discharge port. Slower settling particles will move towards the central axis and travel upwardly, eventually leaving the hydrocyclone through the overflow discharge tube. The discharge tube is normally extending down into the cylindrical section such that shortcircuiting of the feed is prevented.

The efficiency of this operation, that is the sharpness of the separation of the coarser from the finer particles, depends on the size of the apex opening, the feed speed, and the density of the material to be separated and classified. Also the length of the conical section from the cylindrical part to the apex opening will have an impact on the operation of the separation and/or classification.

During operation the inner lining of the hydrocyclone separator will wear, and this is also true for the lining within the apex opening. This has the consequence that one of the parameters which influence the outcome of the separation and/or classification will not be constant during operation. Accordingly, the separation and/or classification will not be consistent during the operation of the hydrocyclone. Further, the apex opening has a tendency to plug during operation, and there may be a need to prevent or elevate any such condition.

GB 889,253 discloses a hydrocyclone having an adjustable discharge orifice. The arrangement of the adjustable discharge orifice according to GB 889,253 adjusts the discharge orifice size, but at the same time the discharge orifice will be moved in axial direction, changing the conical length from the head part and down to the discharge orifice. Thus, even if wear and/or plugging may be compensated for or elevated, one of the main parameters for the classification and/or separation is also changed.

SUMMARY

An object of the invention is to provide an adjustable apex port.

Another object of the invention is to provide an optimal conical shape of the apex discharge port during full apex wear life.

Another object of the invention is to provide an apex port which is adjustable in opening diameter, while maintaining the apex discharge orifice in approximately the same axial position in relation to the head part.

Another object of the invention is to provide an adjustable apex port enabling both widening and narrowing of the apex discharge orifice during operation of the hydrocyclone separator.

According to the invention, these and other objects are achieved, in full or at least in part, by a hydrocyclone separator for classifying solid material in liquid suspension comprising a head part having an inlet conduit, a conically tapered separation part, an adjustable apex discharge port, and a tail pipe. According to the invention the adjustable apex discharge port comprises an abrasive-resistant resilient body in which an apex orifice port is arranged, and an adjustment sleeve configured to circumferentially enclose the resilient body, which sleeve has a tapered conical surface configured to abut an outer surface of the resilient body, and which sleeve is arranged for axial displacement to thereby vary the size of the apex orifice port.

By having an adjustment sleeve with a tapered conical surface configured to abut the abrasive resistant resilient body, an optimal conical shape of the apex discharge port may be provided during full apex wear life.

According to one aspect of the invention, these and other objects are also achieved, in full or at least in part, by a hydrocyclone separator for classifying solid material in liquid suspension, comprising a head part having an inlet conduit adapted to feed a suspension into the head part, and having an overflow discharge tube arranged axially into the head part, a conically tapered separation part, an adjustable apex discharge port, and a tail pipe. According to this aspect the adjustable apex discharge port comprises an abrasive-resistant resilient body having a first section with a central tapered conical aperture forming a continuation of an inner wall of the conically tapered separation part, an apex orifice port, and a second section with a central aperture with a first end facing the apex orifice port and a second end facing and in communication with the tail pipe. The adjustable apex discharge port further comprises an adjustment sleeve configured to circumferentially enclose the resilient body in an axial extension comprising the apex orifice port, with a first sleeve end circumferentially enclosing the first section, and a second sleeve end circumferentially enclosing the second section. The sleeve has a tapered conical surface, which is configured to abut an outer surface of the resilient body, and the sleeve is arranged for axial displacement to thereby vary the size of the apex orifice port. Further, the second sleeve end is arranged so that the second end of the second section at least is aligned with or extends beyond the second sleeve end and into the tail pipe.

One advantage of the hydrocyclone separator according to this first aspect is that the apex discharge port is fully supported independently of the size adjustment of the apex orifice port, and this will remove vibrations and also stop slurry from finding its way in between the resilient body and the adjustment sleeve.

In one of the embodiments, the adjustment sleeve is arranged for tensioning of the resilient body in a radial direction. One advantage of this is that the wear life of the resilient body increases significantly.

In one embodiment, the adjustment sleeve is threadedly arranged for rotational and axial displacement to thereby vary the size of the apex orifice port.

In one embodiment, the adjustment sleeve is arranged for tensioning of the resilient body in a twisted direction. One advantage of this is that it reduces uneven wear of the resilient body, and further the twisting movement during tensioning creates an optimal conical shape at all stages of diameter and wear situations for the first section of the resilient body.

In one embodiment, the outer surface of the abrasive-resistant resilient body and the tapered conical surface of the adjustment sleeve are configured for frictional abutment. This enables a further twisting tensioning of the first section of the resilient body upon threading adjustment of the adjustment sleeve, which twisted tensioning, as stated above, increases the wear life of the resilient body, reduces uneven wear as well as provides for an optimal conical shape of the first section of the resilient body.

In a further embodiment, the second section has a central frusto-conical aperture with a wider diameter in the second end than in the first end thereof.

In one embodiment, the second end of the second section is arranged to extend beyond the second sleeve end into the tail pipe.

When the second section extends beyond the second sleeve end, the resilient body will, if tensioned by the adjustment sleeve, spring out so that the outer surface of the resilient body abuts an edge surface of the second sleeve end.

During operation, the material processed within the hydrocyclone separator apply a pressure on the inner walls of the resilient body, and accordingly, any part of the resilient body which extends outside the adjustment sleeve and not being supported thereof, will be forced out in a radial direction so that the outer surface of the resilient body follows the inner wall of the adjustment sleeve, and abut and bend over the outer edge of the second sleeve end.

If the resilient body is tensioned by the adjustment sleeve, and the resilient body extends beyond the adjustment sleeve, then the outer surface of the resilient body will follow the inner wall of the adjustment sleeve, and abut and bend over the outer edge of the second sleeve end, even during non-operation.

One advantage of having the resilient body to abut and bend over the outer edge of the second sleeve end, is that during widening of the apex discharge orifice, the adjustment sleeve is threadedly rotated for axial displacement in a direction towards the tail pipe and as the resilient body abuts and bends over the outer edge of the second sleeve end, the resilient body will be tensioned even further by being pulled and stretched in an axial direction by the displacement of the adjustment sleeve towards the tail pipe, thereby opening up the apex orifice port.

In one embodiment, the apex discharge port further comprises an apex housing circumferentially enclosing and supporting at least a part of the first section of the resilient body. The first section has a separation end facing the conically tapered separation part and an apex orifice port end facing the apex orifice port, and at least the separation end of the first section is attached to the apex housing.

In one embodiment the attachment is a physically attachment in which the resilient body is clamped between the conical tapered separation part and the apex housing, in another embodiment the resilient body is attached to the housing by an adhesive agent, which may be arranged between a circumferential part of the separation end of the first section and aligned apex housing part.

In one embodiment, the adjustable sleeve is arranged with an actuator for automatic control of the rotational and axial displacement thereof. An example of such actuator is a rotating pinion actuator. However, other actuator arrangements are also possible, such as hydraulic or pneumatic actuators arranged for axial displacement of the adjustable sleeve.

In one embodiment, the adjustable sleeve and the resilient body is arranged for narrowing and widening of the apex orifice port while maintaining the distance between the head part and the apex orifice port substantially unvaried.

The inlet conduit, which is adapted to feed the suspension into the head part, is in one embodiment arranged as a tangentially path, and in one embodiment arranged as a volute path, both are well-known within the technical area.

According to another aspect of the invention, these and other objects are also achieved, in full or at least in part, by a system comprising a plurality of hydrocyclone separators according to anyone of the above disclosed embodiments.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

As used herein, the term "tail pipe" means a pipe skirt which also is termed splash skirt within the technical area.

As used herein, the term an "abrasive-resistant resilient body" means a "one-piece" body comprising all of the first section, apex orifice port and second section, which body is made of a material which is abrasive-resistant, but also resilient to allow compression, and/or twisting by influence of the adjustment sleeve. Examples of such material are rubber or polyurethane. As used herein, the term "wear life" means the time period during which the component or device may be used before it is worn to such an extent that the component or device needs to be replaced.

As used herein, the term "tensioned" or "tensioning" means that the, in this case, the sleeve is arranged to constrict/tensioning the resilient body, preferably in a radial direction, and in addition to the radial direction it may also be constricted/tensioned in a twisted direction, especially in an embodiments where the sleeve is treadedly arranged for rotational and axial displacement.

BRIEF DESCRIPTION OF THE DRAWINGS

The invention will be described in more detail with reference to the appended schematic drawings, which show an example of a presently preferred embodiment of the invention.

FIG. 5a is a cross-sectional view of the adjustable apex discharge port including a tail pipe of another embodiment of the invention.

FIG. 5b is a cross-sectional view of the adjustable apex discharge port of FIG. 5a in which the apex orifice port is adjusted in comparison with FIG. 5a.

FIG. 6a is a cross-sectional view of an adjustable apex discharge port including a tail pipe of yet another embodiment of the invention.

FIG. 6b is a cross-sectional view of the adjustable apex discharge port of FIG. 6a in which the apex orifice port is adjusted in comparison with FIG. 6a.

DETAILED DESCRIPTION

Figure 1:
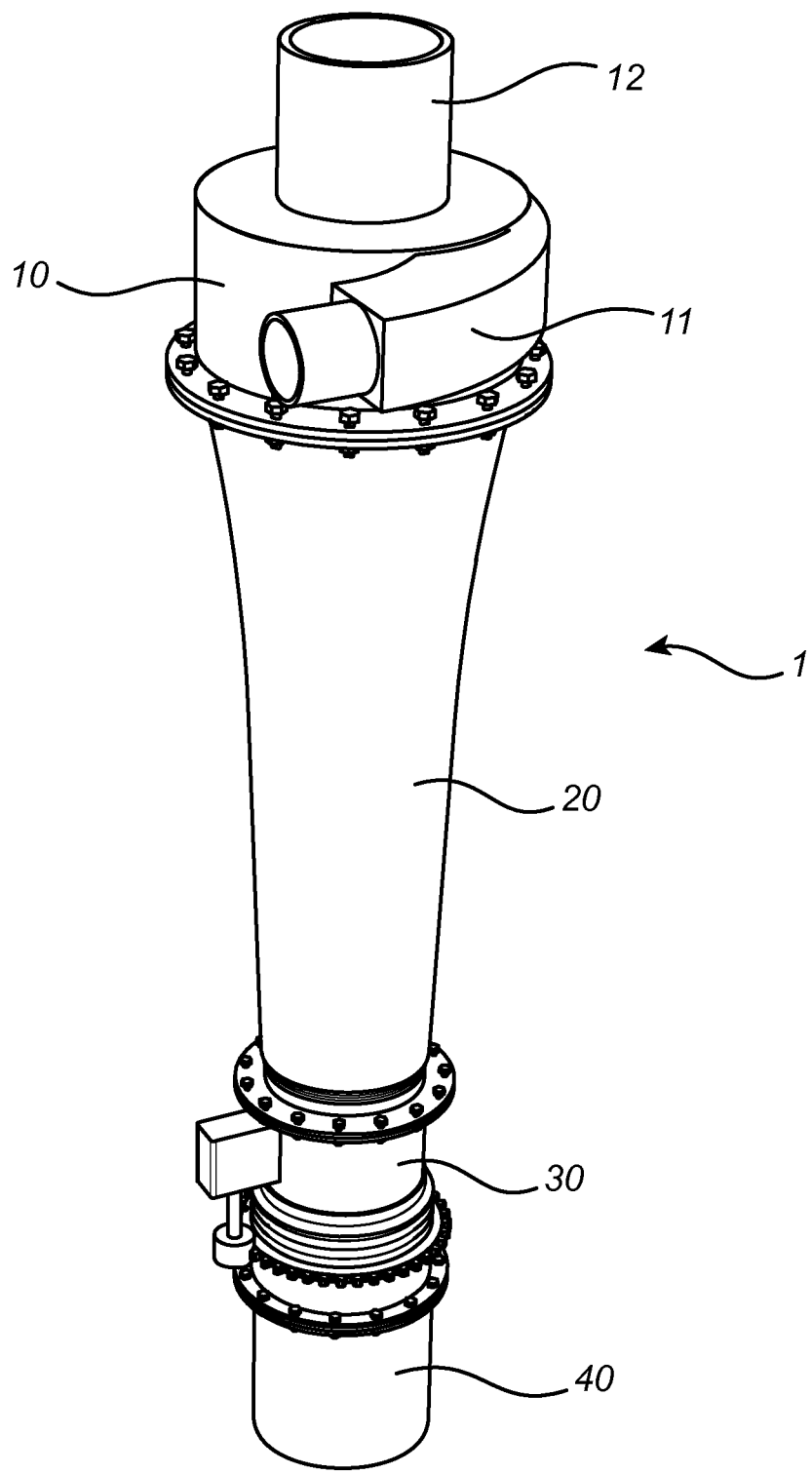
FIG. 1 is a perspective view of a hydrocyclone separator of one embodiment of the invention.

The present invention will now be described more fully hereinafter with reference to the accompanying drawings, in which currently preferred embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1 shows a perspective view of a hydrocyclone separator 1 of one embodiment of the invention. The hydrocyclone separator 1 comprises a head part 10. An inlet conduit 11 is arranged to feed a suspension of solid material into the head part 10, and an overflow discharge tube 12 is arranged axially through the head part 10. The head part 10 is connected with a conically tapered separation part 20.

In one embodiment this conically tapered separation part 20 comprises one conically tapered section with continuously decreasing cone angle, as shown in FIG. 1. However, in other embodiments (not shown) the conically tapered separation part 20 may comprise two or more tapered sections having different cone angles with larger cone angles close to the head part 10 and smaller cone angles further away from the head part 10. In another embodiment (not shown) the conically tapered separation part 20 may comprise one tapered section having one cone angle.

The hydrocyclone separator further has an adjustable apex discharge port 30 and a tail pipe 40.

Figure 2:
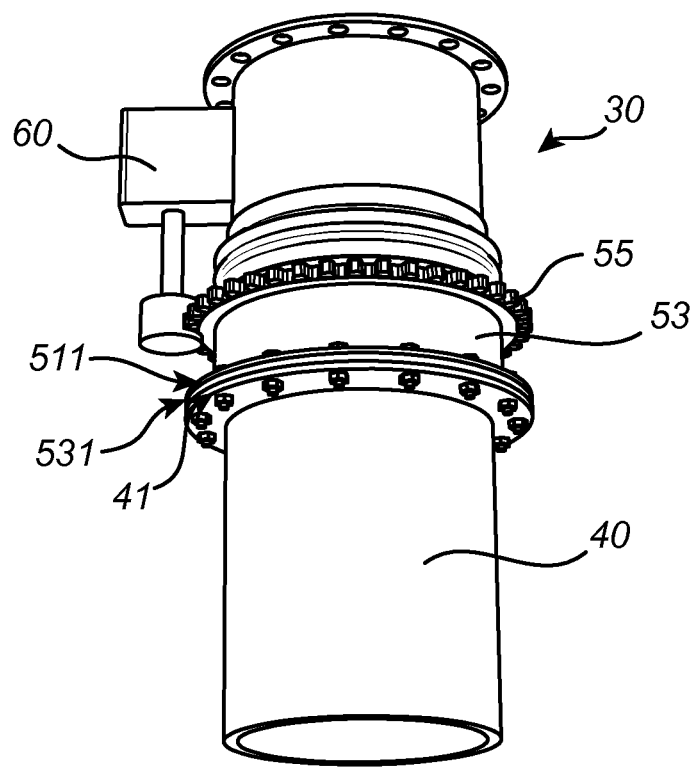
FIG. 2 is a close-up perspective view of an adjustable apex discharge port of an embodiment of the invention including a tail pipe.
Figure 3:
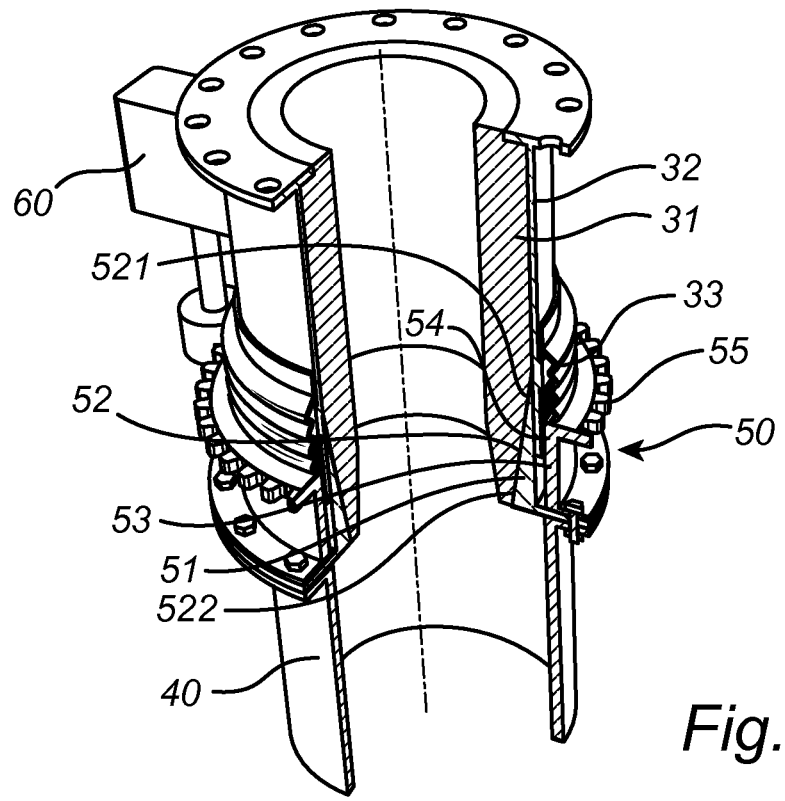
FIG. 3 is a part sectional view of the adjustable apex discharge port including the tail pipe of FIG. 2.

In FIG. 2 a close up perspective view of an adjustable apex discharge port 30 including the tail pipe 40 is shown, and in FIG. 3 a part sectional view of the adjustable apex discharge port 30 including tail part 40 of FIG. 2 is shown. The adjustable apex discharge port 30 comprises in this embodiment an abrasive-resistant resilient body 31, an apex housing 32, a threaded mid part 33 connected with the apex housing 32, an adjustment sleeve 50, and an actuator 60. The treaded mid part 33 is in this embodiment threadedly connected with the apex housing 32 (evident especially from FIG. 4), but also other connection arrangements are possible.

The adjustment sleeve 50 is circumferentially enclosing the resilient body 31 and comprises an inner sleeve member 51 having a tapered conical abutment surface 52, and an outer sleeve member 53 which has an inner treaded surface 54 arranged for interaction with the threaded mid part 33 and an outer circumferentially arranged pinion 55 for interaction with the actuator 60. The inner and the outer sleeve members 51 and 53 may be arranged as separate parts which are joined together with each other and the tail pipe 40 via flanges 511, 531 and 41 as in the shown embodiment, but the sleeve members 51 and 53 may also be arranged as a single-piece part joined via a flange to the flange 41 of the tail pipe 40.

Figure 4:
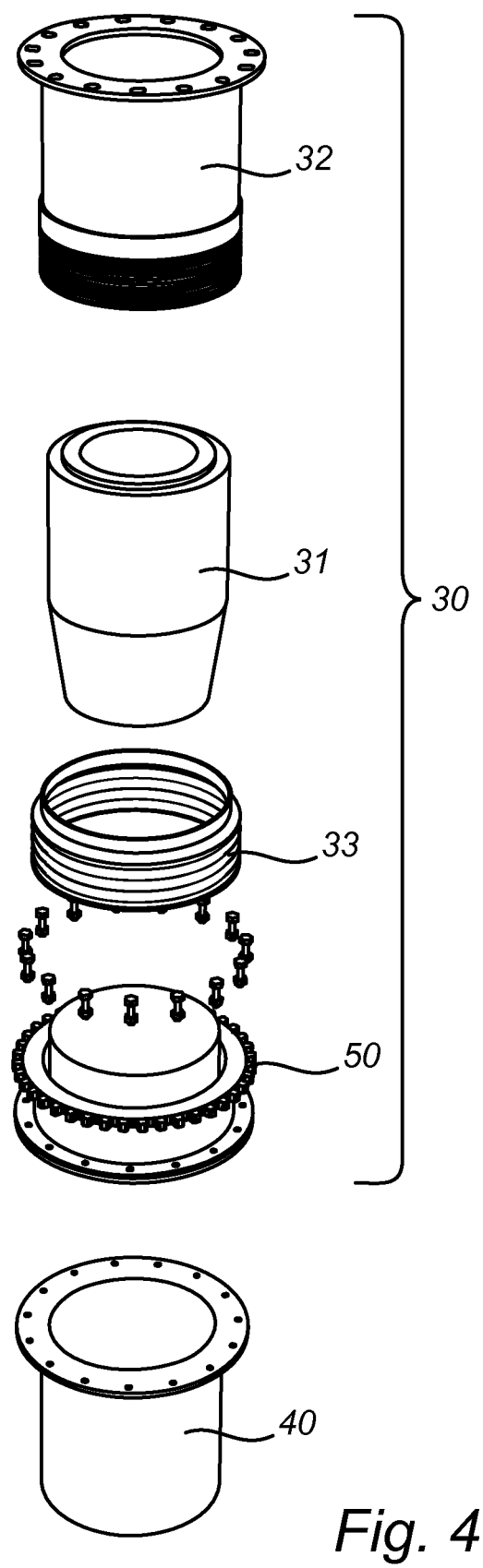
FIG. 4 is an exploded view of an adjustable apex discharge port including the tail pipe of FIG. 1-3.

In FIG. 4 an exploded view of an adjustable apex discharge port 30 including tail pipe 40 from FIGS. 2 and 3 is shown.

Figures 5A, 5B:
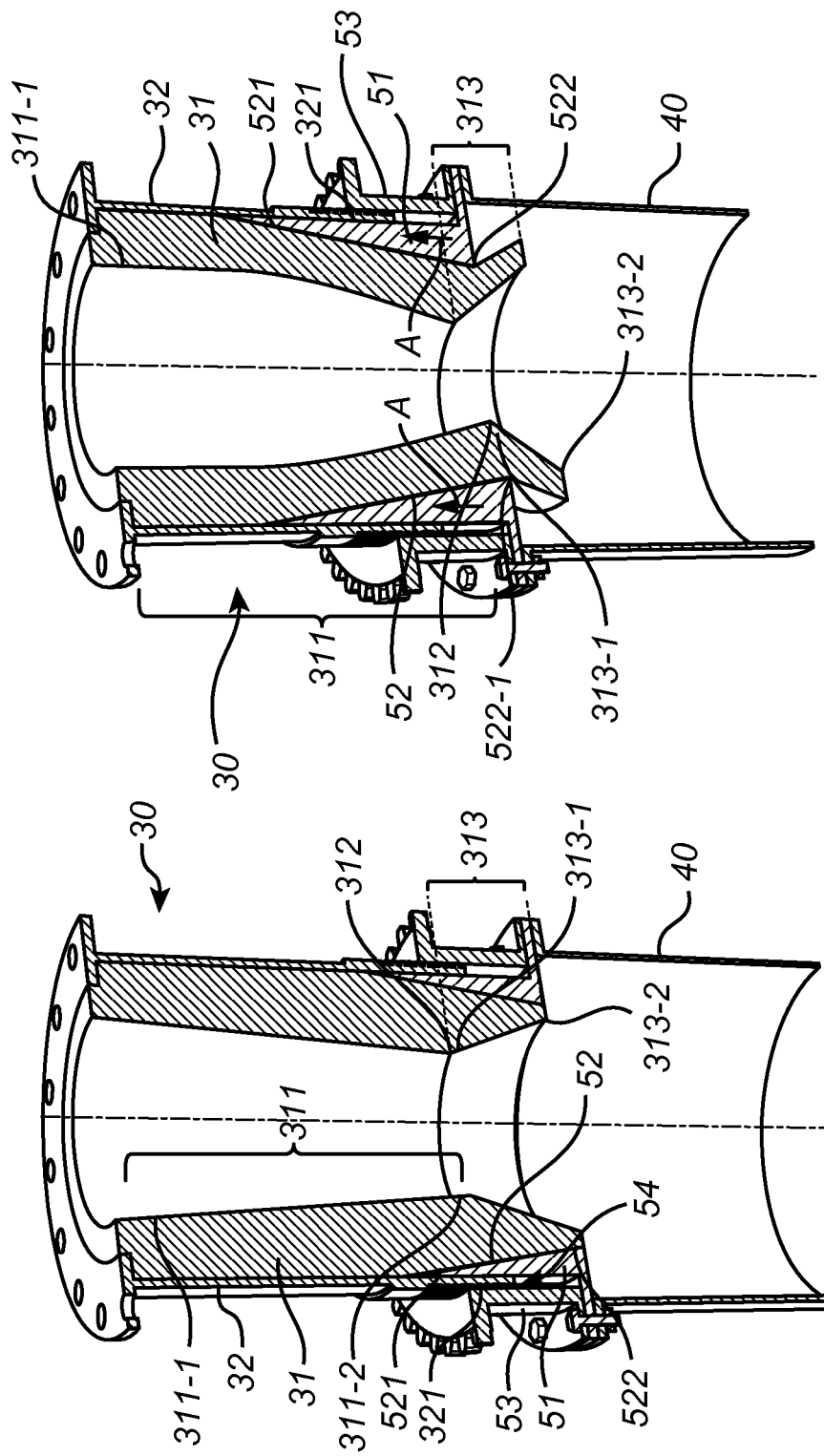

In FIGS. 5a and 5b cross-sectional view of an adjustable apex discharge port 30 of another embodiment of the present invention is shown including a tail pipe 40. In this embodiment the adjustable sleeve 50 is similar to the one in the above given embodiment, but the apex housing 32 has a threaded outer section 321 which is arranged to interact with the inner threaded surface 54 of the outer sleeve member 53. Thus, in this embodiment no separate threaded mid part 33 is arranged between the apex housing 32 and the adjustment sleeve 50.

The wear-resistant resilient body 31 of the invention has in all embodiments a first section 311 with a central tapered conical aperture forming a continuation of an inner wall of the conically tapered separation part 20, an apex orifice port 312 which has the narrowest inner diameter within resilient body 31, and a second section 313 with a central aperture with a first end 313-1 facing the apex orifice port and a second end 313-2 facing and in communication with the tail pipe 40.

In all the shown embodiments the second section 313 has a central aperture having a frusto-conical form with a wider diameter in the second end than in the first end thereof.

The wear-resistant resilient body 31 may in one embodiment further have, at least in a part of the first section, semi-reinforcements arranged within the resilient body material. However, the reinforcement should still allow movement in predetermined directions, such as for example in a twisting movement caused by a rotational adjustment of the adjustment sleeve 50. The reinforcement may comprise reinforcement elements extending in a circular and/or volute direction embedded within the wear-resilient body. In another embodiment the reinforcement elements comprises material chosen from the group consisting of metal wires, glass fiber, which is destructible, non-rusting, and fatigue resistant; polyamide, which has the same advantage as glass fiber and enables the amount of rubber or polyurethane to be reduced; and rubber, polyurethane (PU) or polycarbonate (PC).

The adjustment sleeve 50 of the invention has in all embodiments a first sleeve end 521, which circumferentially enclose the first section 311 of the resilient body 31, and a second sleeve end 522, which circumferentially enclose the second section 313 of the resilient body 31.

As shown in FIG. 5*a*, the apex orifice port 312 is in the most open position, and the second end 313-2 of the second section 313 of the resilient body 31 is aligned with the second sleeve end 522.

As shown in FIG. 5*b*, the apex orifice port 312 has been narrowed in comparison with as shown in FIG. 5*a*, and the inner sleeve member 51 has been moved in an axial direction, A, thereby pushing the resilient body 31 radially inwards closing or narrowing the apex orifice port 312. When the inner sleeve member 51 is moved in an axial direction, the resilient body 31 will at least to some extent extend beyond the second sleeve end 522 and into the tail pipe 40. When extending beyond the second sleeve end 522, the resilient body will spring out and align the outer edge 522-1 of the second sleeve end 522 as shown in FIG. 5*b*.

If the resilient body 31 is arranged with a frictional abutment with the tapered conical surface 52 of the inner sleeve member 51, the resilient body 31 will, at least to some extent, twist together with the inner sleeve member 51 when the sleeve member 50 is rotated for axial displacement thereof. During twisting, the resilient body 31 will be compressed in a twisted direction which will increase the wear life and also reduce uneven wear and create an optimum apex shape at all stages of diameter and wear situations.

However, even though being twistingly compressed, the second end 313-2 of the second section 313 will still, to some extent, extend beyond the second sleeve end 522 and into the tail pipe 40.

The embodiment shown in FIGS. 6*a* and 6*b* is the same as the one shown in FIGS. 5*a* and 5*b* apart from the fact that in this embodiment the second end 313-2 of the second section 313 is arranged to extend beyond the second sleeve end 522 and into the tail pipe 40 already when the apex orifice port is in the most open position, as shown in FIG. 6*a*.

The apex housing 32 and the resilient body 31 is in one embodiment attached to each other. When being attached to each other it is the first section 311 of the resilient body 31 which is attached to the apex housing 32. The first section 311 has a separation end 311-1 facing the conically tapered separation part 20 and an apex orifice port end 311-2 facing the apex orifice port 312. At least the separation end 311-1 is attached to the apex housing 32. This is either accomplished with adhesive agents between the apex housing 32 and the resilient body 31, or by a physically attachment in which a part of the resilient body 31 is clamped between the conical tapered separation part 20 and the apex housing. In another embodiment the resilient body 31 is attached the apex housing 32 by a snap-locking means in form of protrusions which fit matingly into recesses. The protrusions are in one embodiment arranged on the inner wall of the apex housing 32, while the recesses are arranged on the outer surface of the resilient body 31. In another embodiment, the protrusions are arranged on the outer surface of the resilient body 31, while the recesses are arranged on the inner wall of the apex housing 32.

The skilled person realises that a number of modifications of the embodiments described herein are possible without departing from the scope of the invention, which is defined in the appended claims.

For instance, the threaded surfaces 321/54 of one of the apex housing 32 and the outer sleeve member 53, may comprise only one groove while the opposite has a threaded surface. The same is true for the threaded surfaces 33/54 of one of the treaded mid part 33 and the outer sleeve member 53. It is sufficient if one thereof only has one groove while the opposite has a threaded surface.

Further, the actuator does not necessarily have to comprise an automatic actuator as disclosed above, it may also comprise a manually operated actuator.

The invention claimed is:

1. A hydrocyclone separator for classifying solid material in liquid suspension, comprising a head part having an inlet conduit adapted to feed a suspension into the head part, and having an overflow discharge tube arranged axially into the head part, a conically tapered separation part, an adjustable apex discharge port, and a tail pipe, wherein the adjustable apex discharge port comprises:

an abrasive-resistant resilient body having a first section with a central tapered conical aperture forming a continuation of an inner wall of the conically tapered separation part, an apex orifice port, and a second section with a central aperture with a first end of the second section facing the apex orifice port and a second end of the second section facing and in communication with the tail pipe, wherein the second section has a central aperture having a frusto-conical form with a wider diameter in the second end than in the first end thereof, wherein the apex orifice port has a narrowest inner diameter of the abrasive-resistant resilient body; and an adjustment sleeve configured to circumferentially enclose the abrasive-resistant resilient body in an axial extension comprising the apex orifice port, with a first adjustment sleeve end circumferentially enclosing the first section, and a second adjustment sleeve end circumferentially enclosing the second section, which adjustment sleeve has a tapered conical surface configured to directly abut an outer surface of the abrasive-resistant resilient body, and which adjustment sleeve is arranged for axial displacement along the abrasive-resistant resilient body such that the direct contact between the tapered conical surface and the outer surface of the abrasive-resistant resilient body varies the size of the apex orifice port as a result of the axial displacement, wherein the second adjustment sleeve end is arranged so that the second end of the second section at least is aligned with or extends beyond the second adjustment sleeve end and into the tail pipe.

2. The hydrocyclone separator according to claim 1, wherein the adjustment sleeve is arranged for tensioning of the abrasive resistant resilient body in a radial direction.

3. The hydrocyclone separator according to claim 1, wherein the adjustment sleeve is threadedly arranged for rotational and axial displacement to thereby vary the size of the apex orifice port.

4. The hydrocyclone separator according to claim 1, wherein the adjustment sleeve is arranged for tensioning of the abrasive-resistant resilient body in a twisted direction.

5. The hydrocyclone separator according to claim 1, wherein the outer surface of the abrasive-resistant resilient body and the tapered conical surface of the adjustment sleeve are configured for frictional abutment.

6. The hydrocyclone separator according to claim 1, wherein the second end of the second section is arranged to extend beyond the second adjustment sleeve end into the tail pipe.

7. The hydrocyclone separator according to claim 1, wherein the abrasive-resistant resilient body is arranged to, when the second end of the second adjustment section extends beyond the second sleeve end, spring out so that the outer surface of the resilient body abuts an edge surface of the second adjustment sleeve end.

8. The hydrocyclone separator according to claim 1, wherein the adjustable apex discharge port further comprises an apex housing circumferentially enclosing and supporting at least a part of the first section of the abrasive-resistant resilient body, the first section having a separation end facing the conically tapered separation part and an apex orifice port end facing the apex orifice port, and wherein at least the separation end of the first section is attached to the apex housing.

9. The hydrocyclone separator according to claim 1, wherein the adjustable sleeve is arranged with an actuator for automatic control of the rotational and axial displacement thereof.

10. The hydrocyclone separator according to claim 1, wherein the adjustable sleeve and the abrasive-resistant resilient body is arranged for narrowing and widening of the apex orifice port while maintaining the distance between head part and the apex orifice port substantially unvaried.

\* \* \* \* \*